(12) United States Patent
Pierce et al.

(10) Patent No.: US 12,385,116 B2
(45) Date of Patent: Aug. 12, 2025

(54) STEEL ALLOY AND METHOD OF MANUFACTURE EXHIBITING ENHANCED COMBINATION OF HIGH TEMPERATURE STRENGTH, OXIDATION RESISTANCE, AND THERMAL CONDUCTIVITY

(71) Applicants: Cummins Inc., Columbus, IN (US); UT-Battelle, LLC, Oak Ridge, TN (US)

(72) Inventors: Dean T. Pierce, Knoxville, TN (US); Govindarajan Muralidharan, Knoxville, TN (US); James Allen Haynes, Knoxville, TN (US); Yong-Ching Chen, Columbus, IN (US); Quancang Ma, Columbus, IN (US); Howard S. Savage, Columbus, IN (US); Jian Zhou, Columbus, IN (US)

(73) Assignees: Cummins Inc., Columbus, IN (US); UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/785,854

(22) PCT Filed: Jun. 17, 2021

(86) PCT No.: PCT/US2021/037785
§ 371 (c)(1),
(2) Date: Jun. 15, 2022

(87) PCT Pub. No.: WO2022/265639
PCT Pub. Date: Dec. 22, 2022

(65) Prior Publication Data
US 2024/0167134 A1    May 23, 2024

(51) Int. Cl.
*C22C 38/22*    (2006.01)
*C21D 1/22*    (2006.01)
(Continued)

(52) U.S. Cl.
CPC ............... *C22C 38/22* (2013.01); *C21D 1/22* (2013.01); *C21D 6/002* (2013.01); *C22C 38/02* (2013.01);
(Continued)

(58) Field of Classification Search
None
See application file for complete search history.

(56) References Cited

U.S. PATENT DOCUMENTS 3,453,152 A    11/1963    Hill et al.
3,953,201 A    4/1976    Wood et al.
(Continued)

FOREIGN PATENT DOCUMENTS

CA    1181267 A    1/1985
CN    107489810 A    12/2017
(Continued)

OTHER PUBLICATIONS

International Preliminary Report on Patentability received for PCT Patent Application No. PCT/US2021/037785, mailed on Dec. 28, 2023, 12 pages.
(Continued)

*Primary Examiner* — Jenny R Wu
(74) *Attorney, Agent, or Firm* — Faegre Drinker Biddle & Reath LLP

(57) ABSTRACT

A steel alloy with unique and superior combinations of properties such as elevated temperature strength, oxidation resistance, thermal conductivity and wear resistance. Disclosed embodiments comprise or substantially consist of: C in an amount of 0.2-0.45 weight %; Si in an amount of 0.6-1.1 weight %; Mn in an amount of ≤1.1 weight %; Cr in an amount of 2.5-4.0 weight %; one or both of Mo or W, a combined amount of the Mo or W≤0.9 weight %; Ti in an (Continued)

amount of 0.035-0.14 weight %; V in an amount of 0.18-1.1 weight % and the balance being Fe and usual impurities.

22 Claims, 12 Drawing Sheets

(51) Int. Cl.
    *C21D 6/00*     (2006.01)
    *C22C 38/02*     (2006.01)
    *C22C 38/24*     (2006.01)
    *C22C 38/28*     (2006.01)

(52) U.S. Cl.
    CPC .............. *C22C 38/24* (2013.01); *C22C 38/28* (2013.01); *C21D 2211/008* (2013.01)

(56) References Cited

U.S. PATENT DOCUMENTS

| | | |
|---|---|---|
| 4,261,739 A | 4/1981 | Douthett et al. |
| 4,640,722 A | 2/1987 | Gorman |
| 5,051,234 A | 9/1991 | Shinagawa et al. |
| 5,131,965 A | 7/1992 | McVicker |
| 5,310,431 A | 5/1994 | Buck |
| 5,599,497 A | 2/1997 | Cordea et al. |
| 5,843,370 A | 12/1998 | Koyama et al. |
| 5,851,316 A | 12/1998 | Yazawa et al. |
| 6,365,096 B1 | 4/2002 | Sandberg et al. |
| 8,246,767 B1 | 8/2012 | Jablonski |
| 8,900,382 B2 | 12/2014 | Johansson |
| 2007/0025873 A1 | 2/2007 | Magee |
| 2007/0113931 A1 | 5/2007 | Novotny |
| 2011/0297277 A1 | 12/2011 | Jönson et al. |
| 2012/0000336 A1 | 1/2012 | Schremb |
| 2012/0174899 A1 | 7/2012 | Haug |
| 2013/0022833 A1 | 1/2013 | Wakade |
| 2016/0138145 A1 | 5/2016 | Valls |
| 2017/0268084 A1 | 9/2017 | Angles |
| 2021/0071761 A1 | 3/2021 | Kimura |

FOREIGN PATENT DOCUMENTS

| | | | |
|---|---|---|---|
| CN | 109385500 A | 2/2019 | |
| CN | 109338218 B | * 12/2020 | ............ C21D 8/065 |
| EP | 049033 A1 | 4/1982 | |
| EP | 1143025 A1 | 10/2001 | |
| EP | 1520058 B1 | 4/2005 | |
| EP | 2270245 B1 | 1/2011 | |
| EP | 2503016 A1 | 9/2012 | |
| JP | 08209300 A | * 8/1996 | |
| JP | H08209300 A | 8/1996 | |
| KR | 20160041869 A | 4/2016 | |
| WO | 9733010 A1 | 9/1997 | |

OTHER PUBLICATIONS

International Search Report and Written Opinion received for PCT Patent Application No. PCT/US2021/037785, mailed on Sep. 28, 2021, 12 pages.

Supplementary European Search Report and Written Opinion for EP 21899327.7, mailed Sep. 6, 2023.

D. Pierce, et al., "High Temperature Materials for Heavy Duty Diesel Engines: Historical and Future Trends," Progress in Materials Science. 103 (2019) pp. 109-179.

Y. C. Chen, et al. Evaluation of Microalloyed Steel for Articulated Piston Applications in Heavy Duty Diesel Engines, SAE, 2000.

M. Jose, et al. Metallurgical Stability of Articulated Piston Under Severe Engine Operating Condition, 1993.

D. B. V. de Castro, et al., "Influence of Phophorus Content and Quenching/Tempering Temperatures on Fracture Toughness and Fatigue Life of SAE 5160 Steel," Materials Research. 13 (2010) 445-455. https://doi.org/10.1590/S1516-143920100040005.

V. Lepingle, et al., High Temperature Corrosion Behaviour of Some Boiler Steels in Pure Water Vapour, Materials Science Forum, 369-372 (2001), 239-246. https://doi.org/10.4028/www.scientific.net/MSF.369-372.239.

Y. Terada, et al., "Effects of Alloying Additions on Thermal Conductivity of Ferritic Iron," ISIJ Int. 42 (2002) 322-324.

J. Wilzer, et al., The influence of heat treatment and resulting microstructures on the the thermophysical properties of martensitic steels, J. Mater Sc. 48 (2013) 8483-8492.

J. Wilzer, et al., "Influence of Alloying Elements, Heat Treatment, and Temperature on the Thermal Conductivity of Heat Treatable Steels," Steel Research International. 86 (2015) 1234-1241. https://doi.org/10.1002/srin.201400294.

T. Ishitsuka, et al., "Effect of Silicon on the Stream Oxidation Resistance of a 9%Cr Heat Resistant Steel," Oxidation of Metals, 61 (2004) 125-142.

R. A. Mesquita, et al., "On the effect of silicon on toughness in recent high quality hot work steels," Materials Science and Engineering: A 528 (2011) 4856-4859. https://doi.org/10.1016/j.msea.2011.02.065.

K. E. Daehn, et al., "How Will Copper Contamination Constrain Future Global Steel Recycling?" Environmental Science & Technology, Environ. Sci. Tchnol. 51 (2017) 6599-6606.

H. Geng, et al., "Effects of copper content on the machinability and corrosion resistance of martensitic stainless steel," J Mater Sci. 43 (2008) 83-87.

K. Shibata, et al., "Suppression of Surface Hot Shortness due to Cu in Recycled Steels," Mater. Trans. 43 (2002) 292-300.

A. H. Committee, "Properties and Selection: Irons, Steels, and High-Performance Alloys," (1990). https://doi.org/10.31399/asm.hb.v01.9781627081610.

R. Peraldi, B. A. Pint, "Effect of Cr and Ni Contents on the Oxidation Behavior of Ferritic and Austenitic Model Alloys in Air with Water Vapor," Oxidation of Metals. 61 (2004) 463-483. https://doi.org/10.1023/B:OXID.0000032334.75463.da.

N. Cryil, et al., "Effects of Sulfur Level and Anisotropy of Sulfide Inclusions on Tensile," Impact and Fatigue Properties of SAE 4140 Steel, SAE Int. J. Mater. Manf. 1 (2008) 218-227. https://doi.org/10.4271/2008-01-0434.

H. K. D. H. Bhadeshia, "Prevention of Hydrogen Embrittlement in Steels," ISIJ International. 56 (2016) 24-36.

R. S. Hyde, et al., "Phosphorus and Carbon Segregation: Effects on Fatigue and Fracture of Gas-Carburized Modified 4320 Steel," Metall Mater Trans A. 25 (1994) 1129-1240. https://doi.org/10.1007/BF02652297.

* cited by examiner

STEEL ALLOY AND METHOD OF MANUFACTURE EXHIBITING ENHANCED COMBINATION OF HIGH TEMPERATURE STRENGTH, OXIDATION RESISTANCE, AND THERMAL CONDUCTIVITY

GOVERNMENT RIGHTS

The technology described in this disclosure was made under Cooperative Research and Development Agreement No. NFE-19-07668 between Cummins. Inc and UT-Battelle, LLC as management and operating contractor for Oak Ridge National Laboratory. The United States Government may have certain rights to this technology. The United States Government has rights in this invention pursuant to contract no. DE-AC05-00OR22725 between the United States Department of Energy and UT-Battelle, LLC.

CROSS-REFERENCE TO RELATED APPLICATIONS

The present application claims the benefit of International Patent Application No. PCT/US2021/037785, filed Jun. 17, 2021, which is incorporated by reference herein in its entirety.

FIELD

This disclosure relates generally to steel alloys and methods of manufacture. Embodiments include steel alloys having combinations of elevated temperature strength, oxidation resistance and thermal conductivity well suited for applications such as internal combustion engine pistons, other components of internal combustion engines, as well as tools for hot working and forming of metal alloys and other materials.

BACKGROUND

Steel alloys such as 4140 martensitic steel and Micro Alloyed Steel (MAS) (e.g., grade 38MnSiVS5) are used in a variety of applications Examples include internal combustion engine (ICE) components such as pistons. Steels of these types are capable of satisfactory performance in ICE applications (e.g., sufficient high temperature strength, oxidation resistance, and thermal conductivity) at temperatures up to approximately 500° C.

There remains, however, a need for cost effective steels capable of use in applications at even greater cylinder pressures and temperatures, such as for example up to 650° C. or higher. For example, increasing cylinder pressures and temperatures of internal combustion engines can increase the efficiency by which the engines operate, and thereby provide enhancements such as greater fuel economy and reduced emissions. Steels capable of being fabricated into components for ICE operating at higher temperatures would therefore be especially desirable. Such high temperature steels must also be capable of withstanding the mechanical and thermal loads placed on the components during operation. Enhanced high temperature steels with improved elevated temperature properties such as strength and oxidation resistance, accompanied by good thermal conductivity, would be especially useful. Steels of these types that can be efficiently manufactured would be particularly advantageous. Commercial steels such as H11 tool steel have improved oxidation resistance and strength at elevated temperatures relative to 4140 but also contain significantly higher alloy content and are substantially higher in cost.

SUMMARY

Disclosed embodiments include examples of a steel alloy with unique and superior combinations of properties such as elevated temperature strength, oxidation resistance, thermal conductivity, and wear resistance Laboratory tests have demonstrated the steel alloy retains sufficient strength and oxidation resistance at peak temperatures of at least 600° C. The steel alloy can be efficiently manufactured. Internal combustion engines including components such as pistons and piston crowns fabricated from the steel are disclosed. Internal combustion engines including components manufactured from the steel alloys can be operated with enhanced efficiency.

A first example is a steel alloy, comprising: C in an amount of 0.2-0.45 weight %; Si in an amount of 0.6-1.1 weight %, Mn in an amount of ≤1.1 weight %, Cr in an amount of 2.5-4 weight %, one or both of Mo or W, a combined amount of the Mo or W≤0.9 weight %, Ti in an amount of 0.035-0.14 weight %, V in an amount of 0.18-1.1 weight %, S in an amount of 0.0-0.05 weight %; and the balance being Fe and usual impurities.

In embodiments of the first example, a ratio of Ti:C is between 0.078 and 0.7. In any or all of the above embodiments of the first example, a sum of weight % of Mo, W, and V is between 0.9 and 1:35. In any or all of the above embodiments of the first example, the alloy is at least one of (1) austenitized at a temperature greater than or equal to 1140° C. followed by cooling at a rate sufficiently rapid such that austenite transforms to martensite, or (2) simultaneously austenitized and forged at a temperature greater than or equal to 1140° C. followed by cooling at a rate sufficiently rapid such that austenite transforms to martensite. In any or all of the above embodiments of the first example, the alloy has both of (1) thermal conductivity greater than or equal to 28 W/m-K at 400° C. in the in the as-tempered condition and (2) ultimate tensile strength greater than or equal to 500 MPa at 600° C. after the same tempering treatment as (1) plus aging 500 hours at 600° C.

In embodiments of the first example, a sum of weight % of Mo. W. and V is 0.9-1.35. In embodiments, of the first example, the alloy has both of (1) thermal conductivity greater than or equal to 28 W/m–K at 400° C. in the in the as-tempered condition and (2) ultimate tensile strength greater than or equal to 500 MPa at 600° C. after the same tempering as (1) plus aging 500 hours at 600° C.

Embodiments include a steel alloy substantially consisting of a composition of constituents of the steel alloy of the first example. Embodiments include the steel alloy of the first example, wherein the alloy is at least one of (1) austenitized at a temperature greater than or equal to 1140° C. followed by cooling at a rate sufficiently rapid such that austenite transforms to martensite, or (2) simultaneously austenitized and forged at a temperature greater than or equal to 1140° C. followed by cooling at a rate sufficiently rapid such that austenite transforms to martensite.

Embodiments include an internal combustion engine component comprising the steel alloy of the first example.

A second example is a piston or piston crown formed from steel alloy comprising: C in an amount of 0.2-0.45 weight %; Si in an amount of 0.6-1.1 weight %; Mn in an amount of ≤1.1 weight %; Cr in an amount of 2.5-4.0 weight %; one or both of Mo or W, a combined amount of the Mo or W≤0.9 weight %; Ti in an amount of 0.035-0.14 weight %; V in an amount of 0.18-1.1 weight %; S in an amount of 0.0-0.05 weight %; and the balance being Fe and usual impurities; and wherein the steel alloy is incorporated into the piston or piston crown.

In embodiments of the second example a ratio of Ti:C of the steel alloy is between 0.078 and 0.7. A sum of weight % of Mo, W, and V of the steel alloy may be between 0.9 and 1.35. The steel alloy may be at least one of (1) austenitized at a temperature greater than or equal to 1140° C. followed by cooling at a rate sufficiently rapid such that austenite transforms to martensite, or (2) simultaneously austenitized and forged at a temperature greater than or equal to 1140° C. followed by cooling at a rate sufficiently rapid such that austenite transforms to martensite. The steel alloy have both of (1) thermal conductivity greater than or equal to 28 W/m–K at 400° C. in the in the as-tempered condition and (2) ultimate tensile strength greater than or equal to 500 MPa at 600° C. after the same tempering treatment as (1) plus aging 500 hours at 600° C.

In embodiments of the second example a sum of weight % of Mo, W, and V is between 0.9 and 1.35. In embodiments of the second example the steel alloy may be at least one of (1) austenitized at a temperature greater than or equal to 1140° C. followed by cooling at a rate sufficiently rapid such that austenite transforms to martensite, or (2) simultaneously austenitized and forged at a temperature greater than or equal to 1140° C. followed by cooling at a rate sufficiently rapid such that austenite transforms to martensite. In embodiments of the second example the steel alloy may have both of (1) thermal conductivity greater than or equal to 28 W/m–K at 400° C. in the in the as-tempered condition and (2) ultimate tensile strength greater than or equal to 500 MPa at 600° C. after the same tempering treatment as (1) plus aging 500 hours at 600° C. In embodiments of the second example the steel alloy substantially consists of a composition of constituents of the steel alloy of the second example. In embodiments the piston or piston crown substantially consists of the steel alloy.

A third example is a steel alloy, comprising: C in an amount of 0.2-0.45 weight %, Si in an amount of 0.6-1.1 weight %; Mn in an amount of ≤1.1 weight %; Cr in an amount of 2.5-4 weight %; one or both of Mo or W, a combined amount of the Mo or W≤0.9 weight %; V in an amount of 0.18-1.1 weight %; no intentionally added Ti; S in an amount of 0.0-0.05 weight %; and the balance being Fe and usual impurities. Embodiments include a piston or piston crown comprising the steel alloy of the third example. Embodiments include a piston or piston crown comprising a steel alloy substantially consisting of a composition of constituents of the steel alloy of the third example.

A fourth example is a steel alloy, comprising: C in an amount of 0.2-0.35 weight %; Si in an amount of 0.8-1.1 weight %; Mn in an amount of ≤0.55 weight %; Cr in an amount of 2.5-3.5 weight %; one or both of Mo or W, a combined amount of 0.2≤(Mo+W)≤0.7 weight %; Ti in an amount of 0.035-0.14 weight %; in an amount of 0.18-0.55 weight %; S in an amount of 0.0-0.045 weight %; and the balance being Fe and usual impurities. Embodiments include an internal combustion engine component comprising the steel alloy of the fourth example. In embodiments, the internal combustion engine component comprises a steel alloy substantially consisting of a composition of constituents of the steel alloy of the fourth example. Embodiments include a piston or piston crown comprising the steel alloy of the fourth example. Embodiments include a piston or piston crown comprising a steel alloy substantially consisting of a composition of constituents of the steel alloy of the fourth example.

DETAILED DESCRIPTION

Compositions

Figure 1:
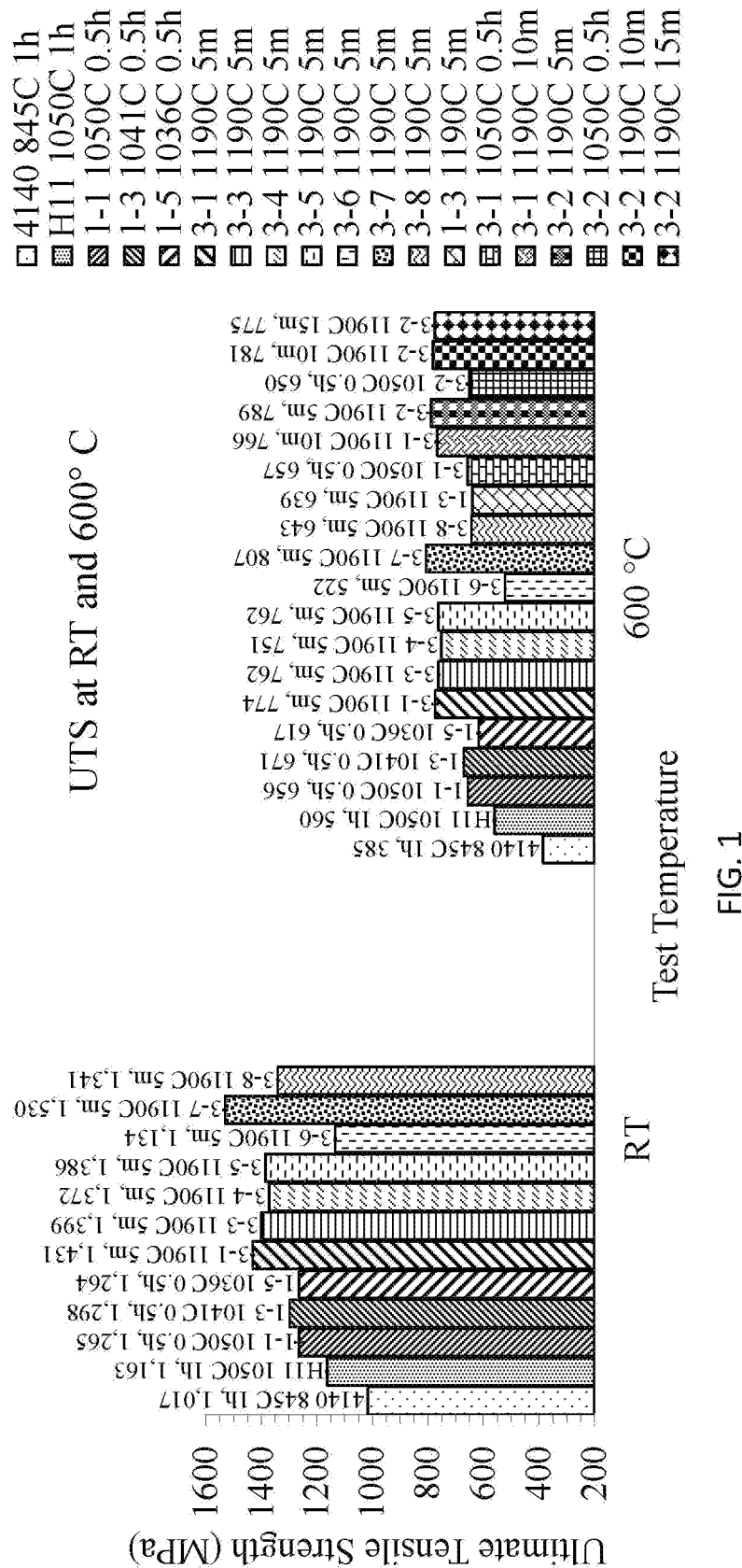
FIG. 1 are graphs of UTS (ultimate tensile strength) at room temperature (RT) and 600° C. for prior art alloys 4140 and H11, and exemplary alloys in accordance with embodiments. The austenitization times and temperatures are shown. In addition, the alloys described in FIG. 1 were tempered at 550° C./2 hr., cooled to RT, and tempered an additional 650° C./2 hr., except for the 4140 which was tempered at 620° C./2 h and H11 which was tempered at 650° C./2 hr., cooled to RT, and tempered an additional 650° C./2 hr.

Exemplary laboratory formed compositions of martensitic steel alloys in accordance with embodiments are described in Tables 1A-1C below (e.g., Example alloys 382, 383, 1-1, 1-2, 1-3, 1-4, 1-5, 3-1, 3-2, 3-3, 3-4, 3-5, 3-6, 3-7, 3-8, 4 and 5). For purposes of comparative examples, compositions of prior art steel alloys 4140 and H11 are described in Table 2 below. The disclosed steel alloy and exemplary compositions in accordance with embodiments have been determined to possess unique and superior combinations of properties such as elevated temperature strength, oxidation resistance, thermal conductivity and wear resistance. The steel alloys and products formed from the alloys can be efficiently fabricated. The example compositions may be characterized as medium C (carbon) martensitic alloy steels containing C, Cr (chromium), Mo (molybdenum), Si (silicon), Mn (manganese), V (vanadium), optionally Ti (titanium), optionally S (Sulfur), additional microalloying additions, residual trace elements from production and/or usual impurities, and the balance (e.g., a majority) Fe (iron). In embodiments, tungsten (W) may be substituted for all or parts of the Mo. Embodiments of the examples listed in Tables 1A-1C consist substantially of C, Cr, Mo (and/or W), Si, Mn, V, optionally Ti, optionally S, and Fe. Residual trace elements and/or usual impurities in the examples described in Tables 1A-1C may include Ni (nickel), P (phosphorus), S (in embodiments without added S), Al (aluminum), Co (cobalt), Cu (copper), Sn (tin), Zr (Zirconium), Nb (Niobium), N (nitrogen) and Ti (in embodiments without added Ti). Small amounts of Ni and or Cu may be intentionally added at the discretion of the producer and or end user Some typical residual trace elements may be added intentionally under certain circumstances to aid in the steel making process, improve specific characteristics of the alloy, or for other reasons. Other embodiments of the steel alloy compositions may include other residual trace elements and/or impurities. As described in Tables 1A-1C, certain constituent elements may be included in specific amounts or ranges. The constituent elements may also be included in predetermined or established relationships, such as a sum ($\Sigma$) of the amounts of Mo, W, and V, and a ratio of the amount of Ti with respect to the amount of C (Ti C) The amounts of the compositions in Tables 1A-1C are in weight percent (wt. %) and were measured after arc melting. The elemental amounts were measured by optical emission spectroscopy (OES) per ASTM E415, with exception that C and S were measured in accordance with ASTM E1019, and Ti was measured by Inductively Coupled Plasma-Atomic Emission Spectroscopy (ICP-AES) in accordance with CAP-017R.

As described in greater detail below, the properties of the disclosed steel alloys, including the example alloys in Tables 1A-1C, make them suitable for a wide range of applications. Examples include components such as pistons, piston skirts, piston crowns, or other parts of pistons for diesel and other internal combustion engines (ICE).

TABLE 1A

Exemplary Alloy Compositions in wt. %

| Element | Example Alloy 382 | Example Alloy 383 | Example Alloy 1-1 | Example Alloy 1-2 | Example Alloy 1-3 | Example Alloy 1-4 | Example Alloy 1-5 |
|---|---|---|---|---|---|---|---|
| C | 0.312 | 0.310 | 0.312 | 0.301 | 0.309 | 0.309 | 0.289 |
| Si | 0.745 | 0.735 | 0.735 | 0.871 | 1.14 | 0.87 | 1.14 |
| Mn | 0.344 | 0.341 | 0.329 | 0.326 | 0.333 | 0.329 | 0.329 |
| Cr | 2.94 | 2.96 | 3.03 | 2.98 | 3.04 | 4.12 | 4.16 |
| Mo | 1.25 | 0.611 | 0.613 | 0.599 | 0.613 | 0.603 | 0.62 |
| Ti | 0.0017 | 0.0031 | 0.0011 | 0.0011 | 0.0011 | 0.002 | 0.0013 |
| V | 0.183 | 0.271 | 0.500 | 0.513 | 0.500 | 0.518 | 0.475 |
| Fe | Bal. | Bal. | Bal. | Bal. | Bal. | Bal. | Bal. |
| $\Sigma$ Mo, W, V | 1.5 | 0.93 | 1.18 | 1.14 | 1.16 | 1.16 | 1.212 |
| Ti:C | 0.0055 | 0.010 | 0.0035 | 0.0037 | 0.0036 | 0.0065 | 0.0043 |
| W* | 0.0679 | 0.0523 | 0.0711 | 0.029 | 0.046 | 0.0396 | 0.0869 |
| Ni* | 0.0044 | 0.004 | 0.0058 | 0.0018 | 0.0052 | 0.0022 | 0.0071 |
| S* | 0.00295 | 0.0032 | 0.0055 | 0.0026 | 0.0055 | 0.0022 | 0.0052 |
| P* | 0.0051 | 0.0053 | 0.0045 | 0.0043 | 0.0047 | 0.0032 | 0.0052 |
| Al* | <0.0050 | 0.00089 | 0.0012 | 0.001 | 0.0014 | 0.002 | 0.0071 |
| Co* | 0.0022 | 0.0026 | 0.002 | 0.002 | 0.0017 | 0.0017 | <0.0015 |
| Cu* | 0.0018 | 0.0025 | 0.0041 | 0.0041 | 0.0033 | 0.0033 | 0.002 |
| Sn* | 0.0072 | 0.0065 | 0.0016 | 0.0016 | 0.002 | 0.002 | 0.0021 | where:

numbers are in weight percent (wt. %)

*represents residual traces/usual impurities

TABLE 1B

Exemplary Alloy Compositions in wt. %

| Element | Example Alloy 3-1 | Example Alloy 3-2 | Example Alloy 3-3 | Example Alloy 3-4 | Example Alloy 3-5 | Example Alloy 3-6 | Example Alloy 3-7 | Example Alloy 3-8 |
|---|---|---|---|---|---|---|---|---|
| C | 0.295 | 0.289 | 0.346 | 0.2901 | 0.358 | 0.279 | 0.458 | 0.338 |
| Si | 0.689 | 0.751 | 0.888 | 0.942 | 0.889 | 0.575 | 1.080 | 0.888 |
| Mn | 0.337 | 0.333 | 0.273 | 0.245 | 0.273 | 0.269 | 0.282 | 0.276 |
| Cr | 3.02 | 3.01 | 2.85 | 2.82 | 2.85 | 2.45 | 3.33 | 2.865 |
| Mo | 0.605 | 0.61 | 0.694 | 0.668 | 0.687 | 0.001 | 0.985 | 0.006 |
| Ti | 0.049 | 0.064 | 0.095 | 0.139 | 0.061 | 0.034 | 0.099 | 0.057 |
| V | 0.518 | 0.526 | 0.543 | 0.540 | 0.537 | 0.265 | 1.125 | 1.120 |
| Fe | Bal. | Bal. | Bal. | Bal. | Bal. | Bal. | Bal. | Bal. |
| Σ Mo, W, V | 1.171 | 1.188 | 1.253 | 1.282 | 1.273 | 0.308 | 2.146 | 1.134 |
| Ti:C | 0.17 | 0.22 | 0.27 | 0.48 | 0.17 | 0.12 | 0.22 | 0.17 |
| W* | 0.0497 | 0.0524 | 0.016 | 0.074 | 0.050 | 0.042 | 0.036 | 0.108 |
| Ni* | 0.0019 | 0.0041 | 0.0067 | 0.0087 | 0.011 | 0.008 | 0.011 | 0.007 |
| S* | 0.0023 | 0.0032 | 0.0021 | 0.0024 | 0.0024 | 0.0023 | 0.0025 | 0.0023 |
| P* | 0.0035 | 0.0039 | 0.0045 | 0.0051 | 0.0045 | 0.0008 | 0.0053 | 0.0040 |
| Al* | 0.0011 | 0.0009 | 0.0004 | 0.0061 | <0.0005 | 0.0016 | <0.005 | 0.003 |
| Co* | 0.0023 | <0.0015 | <0.001 | <0.001 | <0.001 | <0.001 | <0.001 | <0.001 |
| Cu* | 0.0026 | 0.002 | 0.0026 | 0.0105 | 0.0037 | 0.0059 | 0.0014 | 0.0021 |
| Sn* | 0.0016 | 0.0016 | 0.0005 | 0.0006 | 0.0005 | 0.0001 | 0.0009 | 0.0006 |
| N* | 0.0013 | 0.0009 | | | | | | | where:
numbers are in weight percent (wt. %)
*represents residual traces/usual impurities

TABLE 1C

Exemplary Alloy Compositions in wt. %

| Element | Example Alloy 4 | Example Alloy 5 |
|---|---|---|
| C | 0.2-0.45 | 0.2-0.35 |
| Si | 0.6-1.1 | 0.8-1.1 |
| Mn | ≤1.1 | ≤0.55 |
| Cr | 2.5-4.0 | 2.5-3.5 |
| Mo | 0-0.9 | 0.2-0.7 |
| Ti | 0.035-0.14 | 0.035-0.14 |
| V | 0.18-1.1 | 0.18-0.55 |
| W | 0 ≤ W ≤ (0.9 − Mo) | 0.1 ≤ W* |
| Ni | ≤0.25 | ≤0.25 |
| S | ≤0.05 | ≤0.045 |
| Fe | Bal. | Bal. |
| Σ Mo, W, V | 0.30 ≤ (Mo + W + V) ≤ 2.2 | 0.9 ≤ (Mo + W + V) ≤ 1.35 |
| Ti:C | 0.078 ≤ Ti:C ≤ 0.7 | 0.1 ≤ Ti:C ≤ 0.7 |
| P* | ≤0.03 | ≤0.03 |
| Al* | ≤0.06 | ≤0.06 |
| Co* | ≤0.25 | ≤0.1 |
| Cu* | ≤0.5 | ≤0.5 |
| Sn* | ≤0.025 | ≤0.025 |
| N* | ≤0.02 | ≤0.01 | where:
numbers are in weight percent (wt. %)
*represents residual traces/usual impurities

TABLE 2

Comparative Exemplary Prior Art Alloy Compositions in wt. %

| Element | Example 4140 | Example H11 |
|---|---|---|
| C | 0.412 | 0.415 |
| Si | 0.283 | 0.889 |
| Mn | 0.9 | 0.323 |
| Cr | 0.914 | 4.9 |
| Mo | 0.21 | 1.27 |
| Ti | 0.0015 | 0.0045 |
| V | 0.0028 | 0.462 |
| W | <0.0005 | 0.0082 |
| Ni | 0.0474 | 0.049 |
| Fe | Bal. | Bal. |
| Σ Mo, W, V | 0.212 | 1.74 |
| Ti:C | 0.004 | 0.011 |
| P* | 0.013 | 0.008 |
| S* | 0.0268 | 0.0025 |
| Al* | 0.0206 | 0.0605 |
| Co* | 0.0051 | 0.0048 |
| Cu* | 0.181 | 0.0535 |
| Sn* | 0.008 | 0.007 |
| Nb* | 0.002 | <0.01 |
| N* | 0.0070 | 0.003 | where:
numbers are in weight percent (wt. %)
*represents residual traces/usual impurities The foregoing tabulation is provided as a convenient summary and is not intended to restrict the lower and upper values of the ranges of the individual elements for use in combination with each other, or to restrict the ranges of the elements for use solely in combination with each other. Thus, one or more of the ranges can be used with one or more of the other ranges for the remaining elements. In addition, a minimum or maximum for an element, of a broad or preferred composition can be used with the minimum or maximum for the same element in another preferred or intermediate composition. Moreover, the alloy according to the present disclosure may comprise, consist essentially of, or consist of the constituent elements described above and throughout this application. Other elements may be added in small amounts. Here and throughout this specification the term "percent" or the symbol "%" means percent by weight or mass percent, unless otherwise specified.

Figure 2:
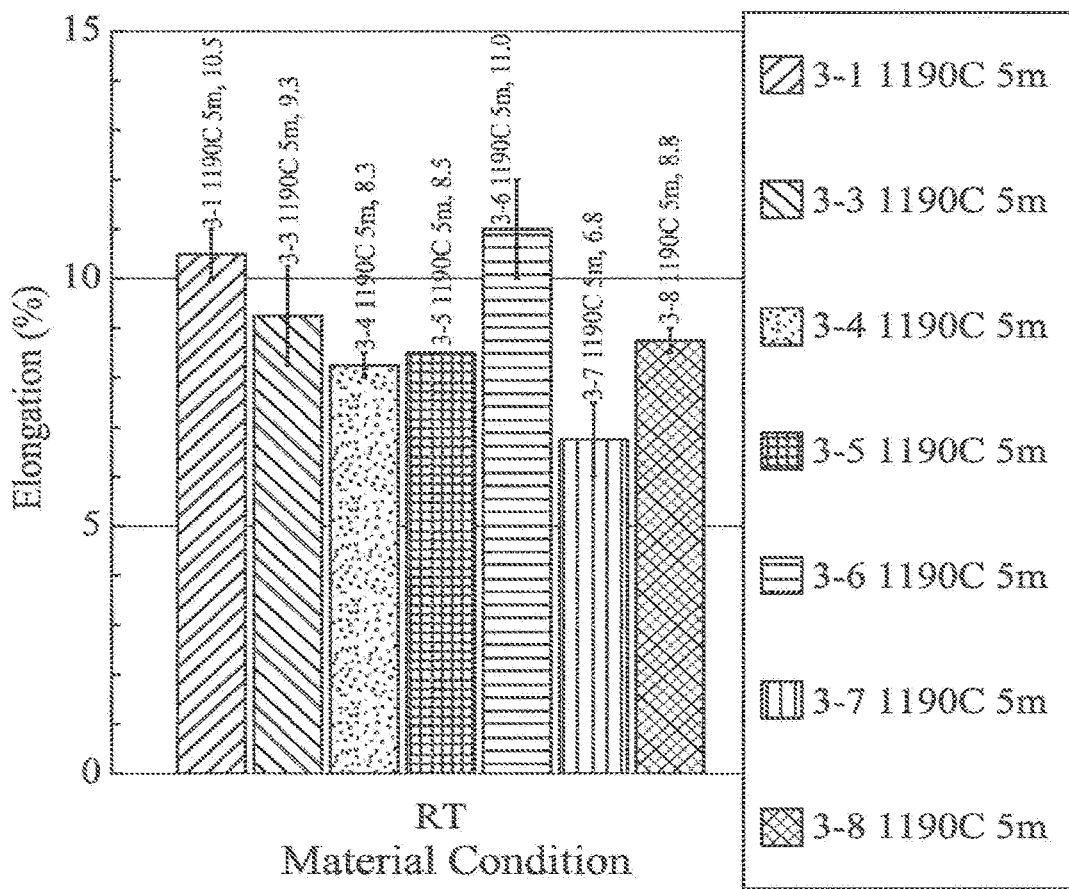
FIG. 2 is a graph of total elongation at RT for exemplary alloys in accordance with embodiments. The alloy samples described in FIG. 2 were austenitized at the times and temperatures indicated in FIG. 2, then oil quenched to RT, tempered at 550° C./2 hr., cooled to RT, then tempered again at 650° C./2 hr.

C: C contributes significantly to elevated temperature strengthening and wear resistance of the alloy through precipitation hardening upon tempering. C combines with alloying elements to form Cr carbides $M_7C_3$ and $M_{23}C_6$, V carbonitrides (V(C/N)), Ti carbonitrides (Ti(C/N)), and $M_6C$ carbides depending on the amount and proportions of carbide forming elements Cr, Mo, V, and Ti as well as the tempering temperature. Applications for the steel alloy, such as ICE pistons and piston crowns, may benefit from high levels of strength both at high temperature regions as well as low temperature areas to accommodate higher peak cylinder pressure (PCP) and temperatures. Too much C in the alloy may cause excessive carbide precipitation, which may degrade ductility and toughness, as well as machinability. In addition, too much C may reduce oxidation resistance due to depletion of Cr from the ferritic matrix. With insufficient C in the alloy, the amount of carbides in the matrix is decreased, resulting in reduced strength and wear resistance. The C in the disclosed alloys in Tables 1A and 1B ranges from 0.279-0.458 wt. %. The range of C content of the disclosed alloys in part contributes to high strength at RT (room temperature) and 600° C., as show in FIG. 1, that are significantly higher than that of 4140 steel. In addition, despite high strength, the alloys remain ductile, as the total plastic elongation for select alloys shows in FIG. 2. In embodiment, the range of C is 0.2 to 0.45 wt %, and those skilled in the art will recognize that modifying only the C content of the alloys between 0.2 and 0.45 wt %, or modifying the C content in conjunction with the amounts of other alloying elements, can optimize the balance of strength, oxidation resistance, thermal conductivity, and machinability for use in the desired application.

Figure 3:
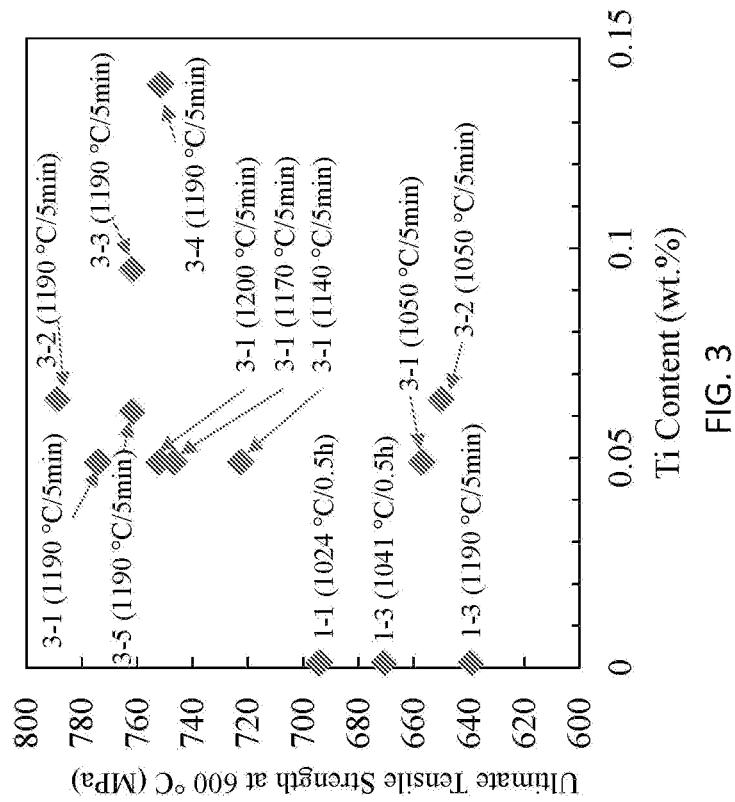
FIG. 3 is a graph of UTS at 600° C. for exemplary alloys in accordance with embodiments as a function of Ti content and austenitization temperature. After austenitization, the steels were oil quenched to RT, tempered at 550° C./2 hr, cooled to RT, then tempered again at 650° C./2 hr.
Figure 4:
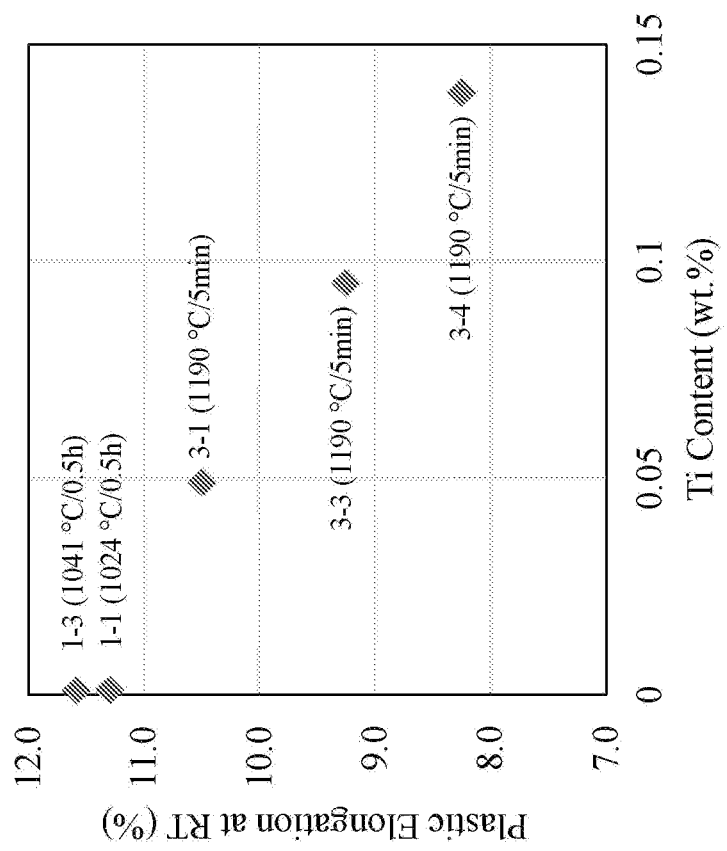
FIG. 4 is a graph of plastic elongation at RT for exemplary alloys in accordance with embodiments as a function of Ti content and austenitization temperature. After austenitization, the steels were oil quenched to RT, tempered at 550° C./2 hr, cooled to RT, then tempered again at 650° C./2 hr.

Ti disclosed alloys include relatively small quantities of Ti ranging from 0.034 to 0.139 wt. %. Tests have determined that these amounts of Ti may result in specific performance improvements to steels with the disclosed amounts of C ranging from 0.279-0.458 wt. %, or to steels with lower C content. Ti has a strong affinity for C and forms TiC carbides, TiN nitrides, or Ti(C/N) carbonitrides in steel, which may be stable to relatively high temperatures. Ti addition to steel may be made to other, relatively high Cr stainless steels (e.g., >8 wt. % Cr) for the purpose of increasing elevated temperature strength and suppressing chromium carbide by preferential formation of TiC, which may improve resistance to oxidation, corrosion, and sensitization. For reasons such as its very high affinity for C, the amount of Ti and C, as well as their ratio, may be controlled. Tests of the alloys disclosed herein have demonstrated that Ti additions to steels containing the relatively larger amounts of C, resulting in a ratio of Ti:C ranging from 0.12 to 0.48, results in significant improvements to elevated temperature strength and temper resistance when combined with optimal heat treatment, as shown in FIG. 3. FIG. 3 illustrates that alloys 3-1, 3-2, 3-3, and 3-4, which have similar composition with the exception that the Ti content is varied, exhibit relatively high UTS, above 750 MPa at 600° C., when austenitized at 1190° C. for 5 minutes, oil cooled, then tempered at 550° C./2 h, cooled to RT, plus 650° C./2 h. In contrast, alloys 3-1 and 3-2 exhibit significantly lower UTS values of 657 and 650 MPa, respectively, when austenitized at the lower temperature of 1050° C. for 0.5 h, but tempered at the same conditions of 550° C./2 h, cooled to RT, plus 650° C./2 h. Also illustrated is that alloys with no intentional addition of Ti, such as alloy 1-1 or alloy 1-3, exhibit UTS values of 694 and 671 MPa at 600° C. after austenitizing at 1024 or 1041° C., respectively, for 0.5 h then tempering. FIG. 3 shows also that austenitizing alloy 1-3 at the high temperature of 1190 C for 5 minutes, followed by subsequent tempering, results in a reduction in UTS at 600° C. to 639 MPa. Therefore, the significant enhancement of strength is achieved by the addition of Ti and the proper heat treatment. FIG. 4 shows that Ti addition up to 0.139 wt. % result in decreased total elongation in alloys which were austenitized at 1190° C. for 5 minutes, quenched in oil, and tempered for 550° C./2 h, cooled to RT, then tempered again for 650° C./2 h, but that the alloys retain acceptable ductility and are not brittle. Embodiments such as disclosed alloys 382, 383, 1-1, 1-2, 1-3, 1-4 and 1-5 have no intentionally added Ti, but may have residual or trace amounts of Ti.

Figure 5:
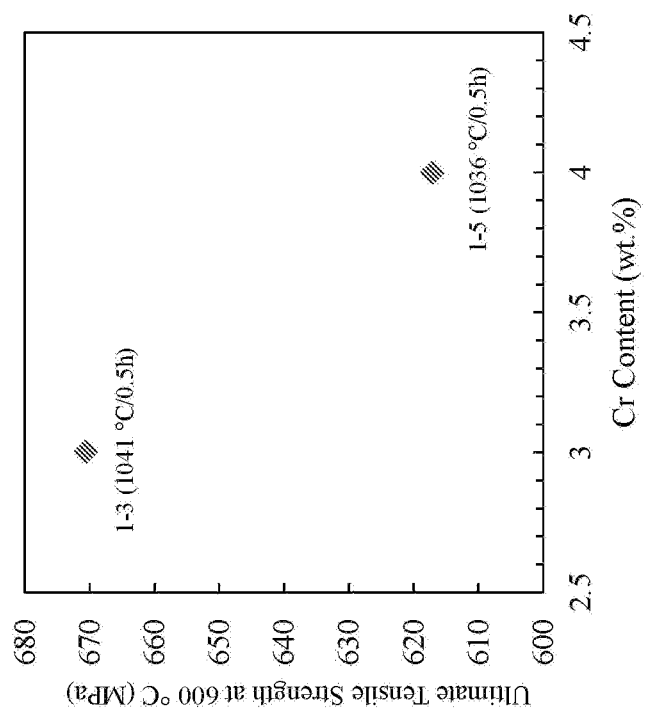
FIG. 5 is a graph of UTS at 600° C. for exemplary alloys in accordance with embodiments as a function of Cr content and austenitization temperature After austenitization, the steels were oil quenched to RT, tempered at 550° C./2 hr, cooled to RT, then tempered again at 650° C./2 hr. The illustrated alloys 1-3 and 1-5 have similar composition with the exception that 1-3 has nominally 3 wt. % Cr while 1-5 has nominally 4 wt. % Cr.
Figure 6:
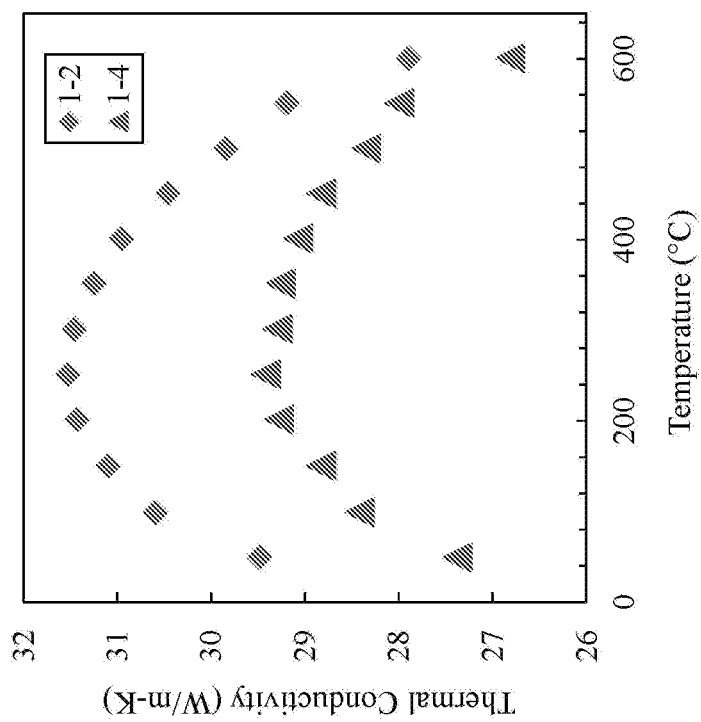
FIG. 6 is a graph of thermal conductivity as a function of temperature for exemplary alloys in accordance with embodiments. The illustrated alloys 1-2 and 1-4 have similar composition, with the exception that 1-2 has nominally 3 wt. % Cr while 1-4 has nominally 4 wt. % Cr.

Cr: The Cr content of the disclosed alloy (e.g., 2.5-4.0 wt. %) is greater than that of 4140 but less than that in H11 steel Cr has effects that may both positively and negatively influence properties such as strength, temper resistance, thermal conductivity, and oxidation resistance. For example, Cr is a relatively strong carbide former and precipitates out as Cr carbides $M_7C_3$ and $M_{23}C_6$, while a portion of Cr remains in solution in the ferritic matrix Cr additions may suppress cementite formation, which may be beneficial to elevated temperature strength and temper resistance. The strength benefit may be the result of a relatively slower coarsening rate of Cr carbides relative to Fe carbides such as cementite. In general, slower coarsening rates means the Cr carbides will remain finer in size with smaller interprecipitate distances, contributing to higher elevated temperature strength levels. However, increasing Cr additions beyond specific amounts may reduce elevated temperature strength and temper resistance. This may result from Cr suppressing the precipitation of V carbonitrides and Mo enriched $M_6C$ type carbides, both of which are typically finer in size and exhibit slower coarsening kinetics than Cr carbides. FIG. 5 illustrates the substantial reduction in elevated temperature strength with increasing Cr content from nominally 3 to 4 wt % in alloys 1-3 and 1-5, respectively. The increase in Cr content from nominally 3 to 4 wt. % also results in a decrease in thermal conductivity at all temperatures from RT to 600° C., as shown by the comparison of thermal conductivity as a function of temperature for alloys 1-2 and 1-4 in FIG. 6.

Figure 7:
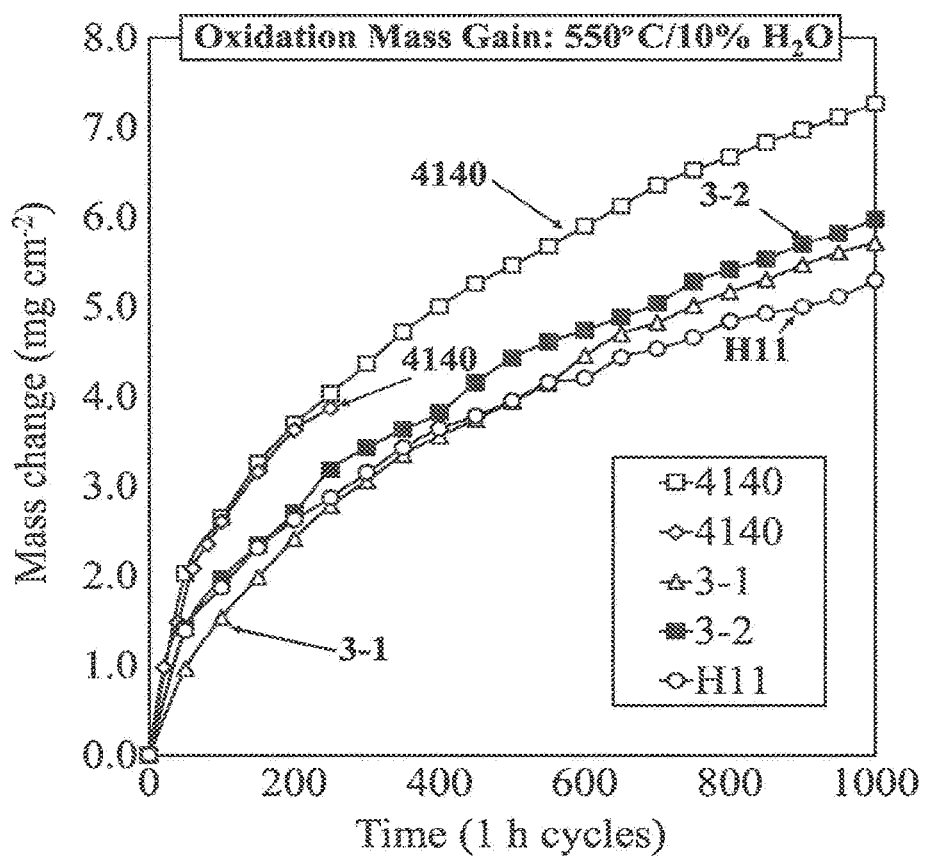
FIG. 7 is a graph of cyclic oxidation mass gain as a function of time in 1 h cycles at 550 C for prior art alloys 4140 and H11, and for exemplary alloys 3-1 and 3-2 in accordance with embodiments.
Figure 8:
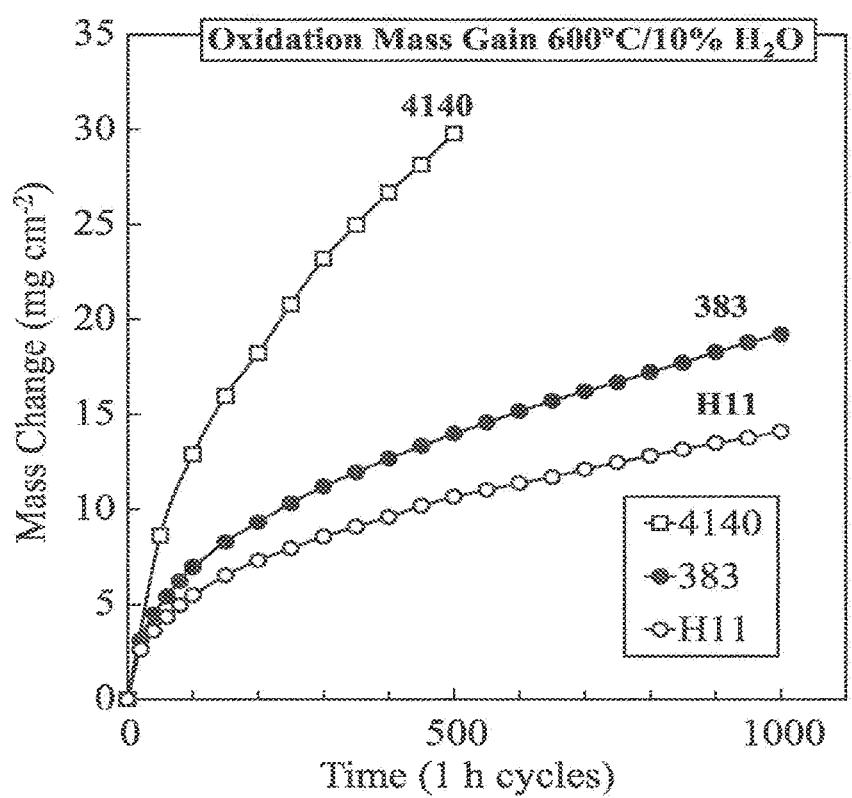
FIG. 8 is a graph of cyclic oxidation mass gain as a function of time in 1 h cycles at 600° C. for prior art alloys 4140 and H11, and for exemplary alloy 383 in accordance with embodiments.

Cr additions may also improve oxidation resistance by reducing oxidation kinetics and improving oxide adherence. However, the effect of Cr on oxidation kinetics in applications such as pistons and piston crowns operating in the range of 500-600° C. may be limited to some extent, particularly at 550° C., due to sluggish Cr diffusion kinetics. FIG. 7 shows the oxidation mass gain during cyclic oxidation testing at 550° C. in air+10% $H_2O$ for 4140, H11, and disclosed alloys 3-1 and 3-2 Alloys 3-1 and 3-2 exhibit similar mass gain to the higher Cr H11 steel and approximately 20% less than 4140. FIG. 8 shows cyclic oxidation mass gain after testing at 600° C. in air+10% $H_2O$, with 3 wt. % Cr alloy 383 showing a 50% reduction in mass gain after 500 1 h cycles relative to 4140 but an approximate 36% increase in mass gain over H11 after 1000 h. In addition, the positive effects of Cr may be reduced in atmospheres containing significant quantities of water vapor (e.g. 5-10% $H_2O$), such as ICE exhaust gasses, due to the evaporation of Cr by the formation of $CrO_2(OH)_2$.

Relatively high amounts of Cr may negatively impact thermal conductivity. Relatively low thermal conductivity can cause undesired higher surface temperatures and steeper temperature gradients within structures such as ICE components during operation. The amounts of Cr in the disclosed example alloys have been demonstrated to provide enhanced oxidation behavior at temperatures up to at least 600° C. while achieving relatively high and suitable elevated temperature strength and thermal conductivity.

Si: Si is a low-cost element that may have effects on oxidation kinetics, oxide adherence, thermal conductivity, and toughness. Si has relatively limited effects on elevated temperature strength and temper resistance in the disclosed steels. Si may reduce the oxidation kinetics during cyclic oxidation in water vapor containing environments. Unlike Cr additions, Si may have more substantial effects on reducing oxidation kinetics at temperatures from 500-550° C. Si, like Cr, may reduce thermal conductivity of the steels. The amounts of Si in the disclosed alloy (e.g., 0.6-1.1 wt. %) have been determined to enhance oxide adherence and reduce oxidation kinetics without excessive negative impacts on thermal conductivity and toughness. The maximum amount if Si in embodiments may be increased up to 2 wt. % to increase oxidation resistance with concomitant reduction in thermal conductivity.

Figure 9:
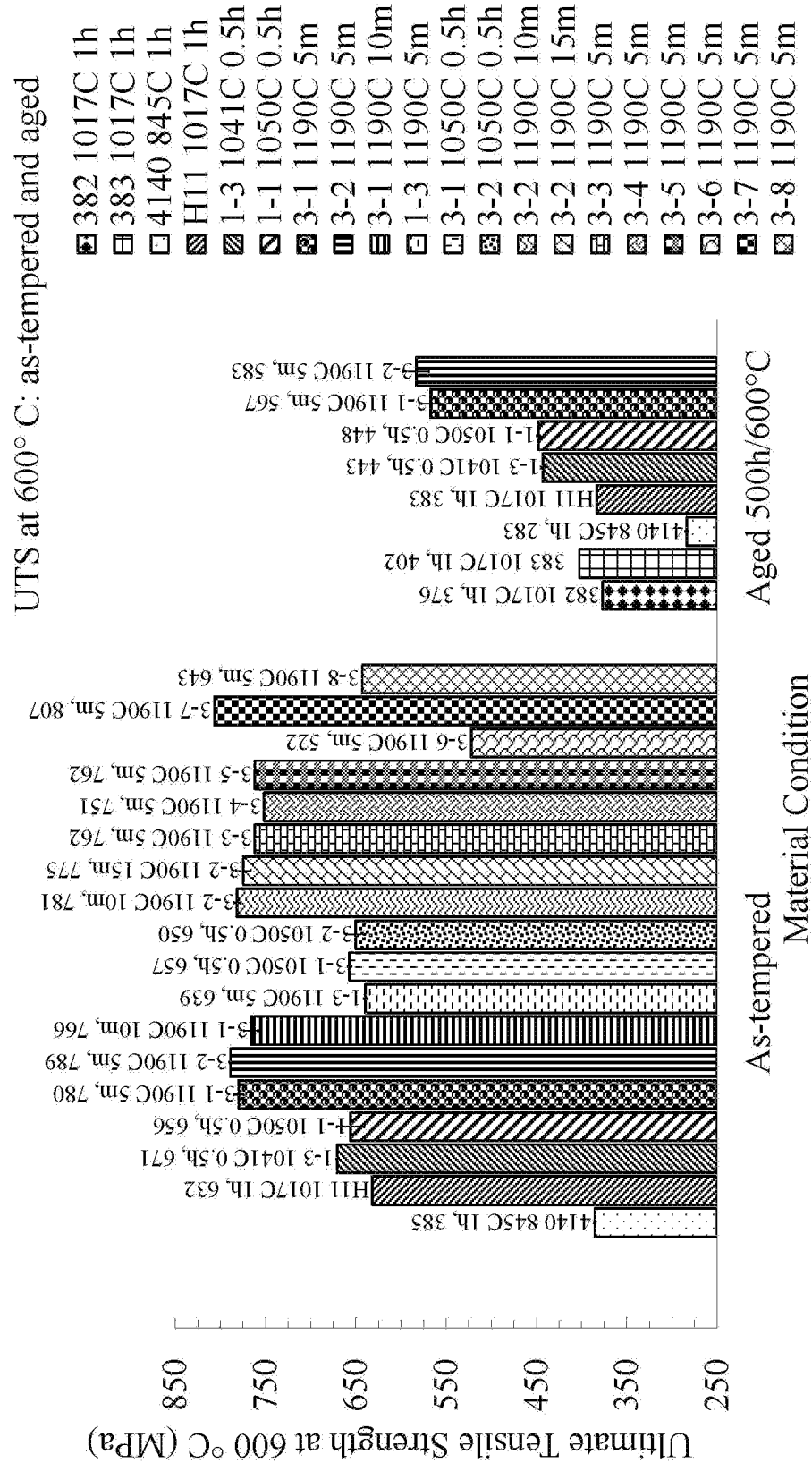
FIG. 9 is a graph of UTS at 600° C. in the as-tempered and as-tempered plus aged 500 h at 600° C. conditions for prior art alloys 4140 and H11, and for exemplary alloys in accordance with embodiments. The austenitization time and temperature are shown for all alloys, and the alloys were double tempered at 550° C./2 h plus 650° C./2 h, except for the prior art 4140 alloy and for the exemplary alloys 382 and 383 in accordance with embodiments. 4140 was tempered at 620° C./2 h and alloys 382 and 383 were tempered at 620° C./2 hr., cooled to RT, and tempered an additional 620° C./2 hr.
Figure 10:
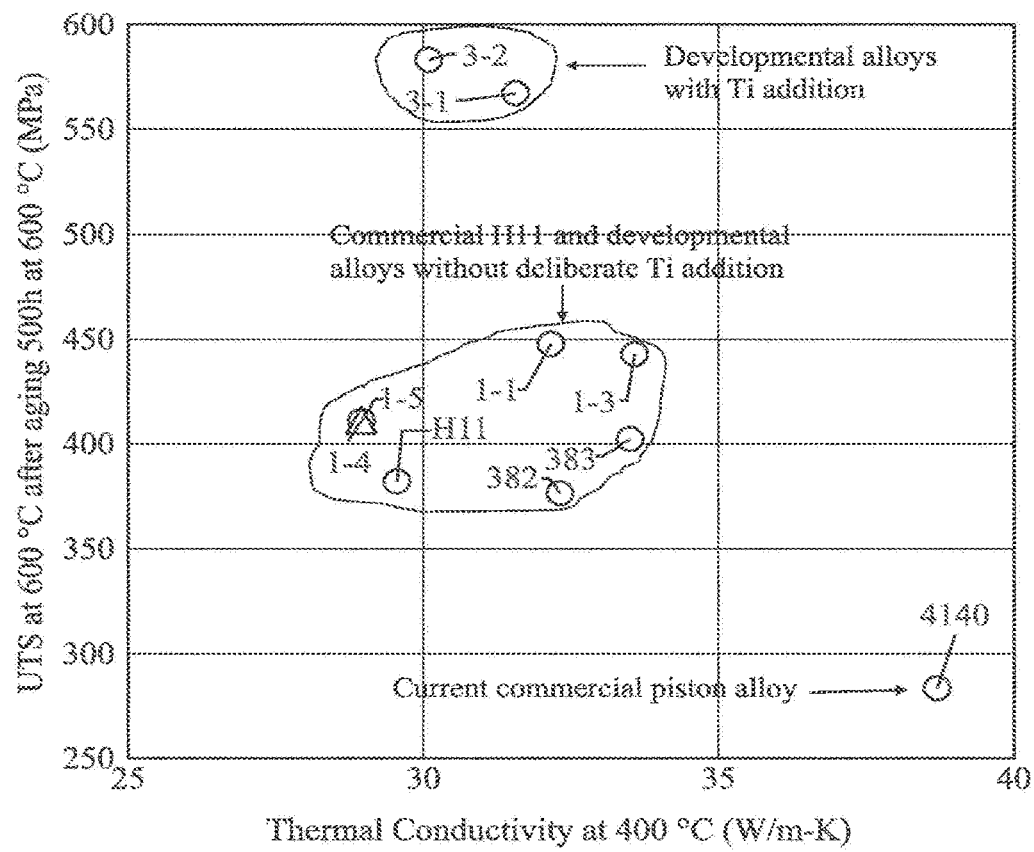
FIG. 10 is a graph of UTS at 600° C. as a function of thermal conductivity measured at 400° C. for prior art alloys 4140 and H11, and for exemplary alloys in accordance with embodiments.

Mo: Mo additions may promote solid solution strengthening, temper resistance, secondary hardening, and increase oxidation and corrosion resistance while excessive Mo can result in degraded thermal conductivity and limited additional strengthening benefit. Mo and V may be two primary carbide forming and strengthening elements in high strength steels for elevated temperatures. Tests have demonstrated that the replacement of significant quantities of Mo with smaller quantities of V produces improvements in elevated temperature strength after long term thermal exposure while also resulting in improved thermal conductivity, with relatively small amounts or no significant degradation to cyclic oxidation resistance in air plus 10% water vapor at 550° C. in the present alloys. Such effects are illustrated in FIGS. 9 and 10 with disclosed alloy 383 (0.61 wt. % Mo/0.27 wt. % V) exhibiting greater thermal conductivity at 400° C. in the as-tempered condition and greater tensile strength at 600° C. after long term 500 h thermal exposure at 600° C. relative to alloy 382 (1.25 wt % Mo/0.18 wt. % V), which contains significantly greater Mo content and slightly less V content but similar amounts of other elements Material costs may also be lowered if Mo content is reduced to levels below 1.25 wt. %, which is a common Mo content in tool steels such as H11 and H13. The amounts of Mo in the disclosed alloy (e.g., 0.0-0.9 wt. %) have been determined to in part enable high elevated temperature strength while not significantly degrading thermal conductivity or substantially increasing costs.

W: Tungsten (W) additions may promote hardenability, elevated temperature strength through solid solution strengthening, and temper resistance by reducing the coarsening rate of $M_{23}C_6$ carbides. W additions may also reduce the thermal conductivity of steels. Tests have demonstrated that replacing Mo by equivalent weight in W may have limited beneficial or negative effect in terms of the combination of elevated temperature strength and thermal conductivity of the disclosed alloy. However, replacing Mo with W may promote increased hardenability and a slight reduction in oxidation resistance. Accordingly, in the disclosed alloy, amounts of W may be substituted for equal amounts of Mo (e.g., W≤0.9−Mo). Stated differently one or both of Mo or W may be included, where a sum of the amounts of Mo and W is equal to 0.0-0.9 wt. %. In some embodiments, W is not added, and may be present in impurity/trace amounts. Other embodiments include intentionally added amounts of W V: V additions may promote elevated strength through precipitation hardening by the formation of vanadium carbides. Due to a high affinity for C, V may be substantially precipitated out as carbide, with relatively small amounts remaining in solid solution. With too little V, the strengthening effect may not be sufficient at elevated temperatures. In addition, too much V may also result in quantities of V remaining in solid solution, which can have a deleterious effect on thermal conductivity. The amounts of V in the disclosed alloys (e.g., 0.18-1.13 wt. %) have been determined to provide high elevated temperature strength while limiting amounts that may otherwise excessively increase costs or reduce thermal conductivity.

Mn: Mn may provide an important manufacturing function by removing S from solution through the formation of MnS, which may improve toughness and fatigue strength. Mn may also provide hardenability and solid solution strengthening. The amounts of Mn in the disclosed alloy (e.g., ≤1.1 wt. %) is sufficient to remove S from solution, while not resulting in undue reductions in thermal conductivity or oxidation resistance.

Ni: Ni is an austenite stabilizer and may suppress the martensite start temperature and critical temperatures $A_{e1}$ and $A_{e3}$. Ni may promote toughness, hardenability, and oxidation resistance when added to steel. Ni may also aid in suppression of Cu hot shortness. Those skilled in the art know that Ni additions of approximately one third or one half the amount of Cu in steel may aid in the suppression of hot shortness in steels containing Cu. It is well known by those skilled in the art that certain steels for use in high temperature applications, such as 422 martensitic stainless steel, contain Ni up to 0.8 wt. % In embodiments, Ni may be present or added in amounts ≤0.25 wt. %. In other embodiments Ni is a residual trace element or usual impurity. In embodiments, such as for example embodiments used to form pistons or piston crowns, Ni may be added in amounts up to and including 0.8 weight %.

S may be added to improve machinability S is known to reduce the fatigue life and impact resistance of steel by the segregation to grain boundaries and the formation of sulfides, which can lead to cracking in use. The S content is equal to or below 0.05 wt. % in embodiments of the alloy. Other embodiments may include greater amounts of S (e.g., to improve machinability). In other embodiments S is a residual trace element or usual impurity.

Sum of Mo, W, V: As described in Tables 1A-1C, embodiments of the alloy have a total amount of Mo, W, and V ranging from 0.30 to 2.2 wt. %.

Residual traces/impurities: As described in Tables 1A-1C, the example alloys include residual trace amounts of constituent elements or components in addition to the desired constituent elements. These residual trace amounts of constituent elements or components are effectively impurities in the alloy, and may be present in amounts typical for steel alloys as is well known in the art. These residual trace amounts of constituent elements or components may, for example, be artifacts resulting from sources of the desired constituent elements or the manufacturing processes. In the example alloys described in Tables 1A-1C, the residual elements P, Al, Co, Cu and Sn are generally present in amounts less than 0.01 wt. %. However, other embodiments of steel alloys in accordance with this disclosure, such as compositions formed in relatively larger quantities (e.g., for commercial applications) may have greater or lesser amounts of these and/or other residual traces or impurities, such as for example as described below. For example, unavoidable impurity elements in the alloys in accordance with this disclosure may also include but not be limited to Mg (magnesium), Nb (niobium), Ta (tantalum), N (nitrogen), B (boron), Ca (calcium), Se (selenium), Bi (bismuth), Te (tellurium), Ti and O (oxygen).

Cu: Cu is labeled as a residual trace element or usual impurity in Tables 1A-1C However, Cu generally may be either added to steel intentionally or introduced as an impurity during the production of the steel (e.g., due to the presence of Cu in steel scrap, pig iron, or some other primary constituent). Cu promotes atmospheric corrosion resistance and also strength through precipitation hardening when specific levels of Cu are present in the steel. Cu can also cause hot shortness and deteriorate the hot workability of the steel unless specific alloying additions are made or other precautions are taken, such as controlling the atmosphere or heating rates during hot working. In other exemplary embodiments of alloys in accordance with embodiments of this disclosure, Cu may be less than 0.5 wt. %

N: N combines with Ti to form stable Ti(C,N) precipitates, thereby removing Ti from the solution in austenite during austenitization, which may reduce the precipitation of fine Ti(C,N) upon subsequent quenching and tempering. The reduction of fine Ti(C,N) can reduce elevated temperature strength Therefore, N is preferably equal or less than 0.02 wt. %, and more preferably equal or less than 0.01 wt. % in embodiments of the alloy.

P: P is typically an impurity element in steel but is sometimes intentionally added to improve machinability. P can segregate to interfaces and grain boundaries in steel and can have deleterious effects on toughness and fatigue strength. The P content is at or below 0.03 wt. % in embodiments of the alloy.

Zr: Zr combines with C and N to form ZrC, ZrN, and/or Zr(C/N) precipitates which are stable to relatively high temperatures. It is known by those skilled in the art that ZrC and ZrN may have greater thermal stability relative to TiC and TiN, respectively, which may be beneficial during industrial steel production where higher N levels are present. Zr may consume C and N preferentially relative to Ti, which can result in greater amounts of Ti in solution in austenite during high temperature heat treatments, which may provide enhanced strengthening after subsequent quenching and tempering. The Zr content is at or below 0.1 wt. % in embodiments of the alloy.

Others: In embodiments of the alloy, the balance of other unavoidable impurities is preferably restricted to the following composition ranges or limits: Mg≤0.005 wt %, Co≤0.25 wt %, Nb≤0.03 wt %, Ta≤0.03 wt %, Zr≤0.1 wt %, Al≤0.06 wt. %, B≤0.003 wt. %, Ca≤0.002 wt %, Se≤0.05 wt %, Bi≤0.008 wt %, Te≤0.065 wt %, As≤0.05 wt %, Sn≤0.025 wt %, and O≤0.08 wt %.

Process

Conventional or otherwise known industrial melting, casting, rolling and/or forging, and heat treating processes and sources of constituents can be used to manufacture the alloy.

The alloys may also be manufactured by other methods, including but not limited to additive manufacturing (AM) and powder consolidation processes. Additive manufacturing may be particularly advantageous for the printing of the entire piston, or either the crown or skirt separately. Additive manufacturing may also be combined with traditional piston manufacturing processes in a hybrid manufacturing process. The range of composition of the disclosed alloy permits manufacture by AM.

Desirable properties of the alloy, including example alloys 3-1, 3-2, 3-3, 3-4, 3-5, 3-6, 3-7, and 3-8, may be enhanced by heat treating the alloys. The heat treatment which may be used in connection with the alloys may generally include several steps but some steps may be modified or omitted as appropriate or otherwise determined by those skilled in the art. The steps may include a preheat, high temperature austenitization, quench, and one or more tempering treatments. A preheat step may not be critical for development of optimum strength properties but may be incorporated into the heat treatment according to best practices, to equilibrate temperature through the thickness of the part, etc. The high temperature austenitization treatment, which may follow the preheat (if pre heat is performed), is preferably performed at a temperature greater than or equal to about 1140° C. to develop relatively high strength properties. In lab testing, heat treating the sample between 5 and 15 minutes at 1190° C. was sufficient to develop significantly higher strength properties than at lower temperature austenitization treatments at 1050° C. or below. In addition, austenitization treatments at temperatures as low as 1140° C. for 5 minutes were sufficient to significantly enhance elevated temperature strength propertied as shown in FIG. 3. As such, a relatively high temperature austenitization treatment may be used in connection with the alloy to improve strength levels. However, the time period of the austenitization treatment may be adjusted by those skilled in the art to longer or shorter times, depending on factors such as the specific austenitization temperature, part dimensions, grain size requirements, and final properties desired. The austenitization treatment may also be combined with mechanical deformation in a single step, such as in a forging operation to form the piston bowl rim or other part of the piston or part. The austenitization step may also be one of multiple austenitization or forging steps in which one or more of the steps is performed at a temperature of 1140° C. or higher as measured by furnace temperature or temperature anywhere on the part. Upon completion of the austenitization treatment (or combined forging and austenitizing treatment), the alloy is quenched by cooling from the austenitization temperature, for example by water, oil, pressurized gas, and/or some other suitable medium, to a temperature at or below the martensite finish temperature. The cooling rate of the part is preferably sufficient to cause martensitic transformation. Subsequent tempering temperature, time, number of tempering steps, etc., may be selected by those skilled in the art to develop the optimum balance of properties for the application.

Any suitable process and or equipment may be used to heat treat the alloys.

Subsequent pistons manufactured from the alloy may also be surface treated, surface modified, or coated. These processes may include but are not limited to oxidation resistant coatings, thermal barrier coatings, corrosion resistant coatings (e.g., ZnP), overlays, other types of coatings, shot peening, laser peening, nitriding, carburizing, etc.

The relatively high austenitization temperatures of 1140° C. or greater which are performed in connection with certain embodiments of the alloy have been determined such that a sufficient portion of Ti may remain in solid solution in the austenite phase under equilibrium conditions, for subsequent precipitation in the martensite phase after quenching and during tempering, while the remaining Ti may be present in primary TiC carbides to act, as grain boundary pinning agents to suppress grain growth at the high austenitization temperature. These relatively high austenitization temperatures may increase the thermodynamic driving force for solutionizing vanadium, chromium, and titanium carbides, nitrides, and/or carbonitrides, thereby enabling these elements to precipitate as fine carbides after quenching and upon subsequent tempering, potentially improving elevated temperature strength. Therefore, while the relatively small addition of Ti may improve elevated temperature strength directly through precipitation of secondary TiC carbides, it may also enable higher austenitization temperatures to be employed, which may enhance solutionization of vanadium or other carbides, and result in greater amounts of carbide precipitation on subsequent tempering. For purposes of comparative example, it has been determined for the alloys 3-1 and 3-2, when austenitized at a lower temperature such as 1050° C. for 0.5 h, quenched, then double tempered (e g 550° C./2 h, 650° C./2 h), the UTS levels in the as-tempered condition at 600° C., are 657 MPa and 650 MPa, respectively. These UTS levels have been determined to be about 16-18% lower than the UTS values of the alloy at 600° C. after austenitization at 1190° C. for 5 minutes (e.g., 780 MPa and 789 MPa, respectively). Furthermore, it has been determined that alloys with similar compositions to example alloys 3-1 and 3-2, but without the Ti addition, do not show significant improvement in the UTS at 600° C. when austenitized at 1190° C. for 5 minutes. These determinations at least suggest that in connection with the alloy, Ti addition and a relatively high temperature heat treatment such as those described above, such as at 1140° C. or greater, enables some degree of solutionization of TiC carbides and or other carbides which may provide substantial improvement in elevated temperature strength of the alloy. It has also been determined that elevated temperature UTS at 600° C. in the as-tempered condition may not demonstrate significant changes when the austenitization time at 1190° C. is increased from 5 to 15 minutes in the alloy.

Benefits

The alloy, especially when heat treated as described herein, has been determined to exhibit significant improvement in the combination of properties including elevated temperature strength, resistance to softening, thermal conductivity and oxidation resistance over other steels, such as for example 4140, MAS, and H11 tool steel.

FIG. 10, for example, illustrates the UTS at 600° C. in the as tempered condition and after aging 500 h at 600° C., plotted against thermal conductivity at 400° C. determined for alloy 3-1 and alloy 3-2, as well as other steels such as commercial 4140 and H11 and other disclosed alloys. The tensile testing was performed using conventional approaches and equipment and in accordance with ASTM E8/21 and the load frames were calibrated in accordance with ASTM E4, ASTM 2309, and to the manufacturer's specifications for temperature control. The thermal conductivity was calculated from thermal diffusivity, density determined by dilatometry, and specific heat capacity measurements, which were obtained in accordance with ASTM E1461-13 and ASTM E1269-11, respectively. FIG. 10 shows that the disclosed alloy exhibits superior UTS at 600° C. after aging 500 h at 600° C. relative to such other alloys. In addition, the alloys exhibit thermal conductivity of 30-32 W/m–K at 400° C. in the as tempered condition, indicating the significant increase in strength of the disclosed alloys over the other illustrated alloys did not come at the expense of thermal conductivity. The superior combination of high strength and thermal conductivity will enable the alloy to withstand relatively high PCPs in ICE applications while not resulting in excessive piston surface temperatures, which can increase oxidation and locally reduce strength in the high temperature areas on the surface. Furthermore, alloys which do not contain intentional additions of Ti and are not austenitized at temperatures greater than 1140° C. have UTS values at 600° C. after aging 500 h at 600° C. below 500 MPa.

The desirable oxidation resistance properties of the disclosed alloys are demonstrated by FIG. 7, which illustrates by mass change data measured during cyclic oxidation tests at 550° C. in air+10% $H_2O$ for example alloys 3-1 and 3-2. The oxidation resistance of example alloys 3-1 and 3-2, for example, are shown to have values over those of other steels such as 4140, while being in a range similar to those of other steels such as H11 with higher Cr content. FIG. 8 shows cyclic oxidation mass gain after testing at 600° C. in air+10% $H_2O$, with 3 wt. % Cr alloy 383 showing a 50% reduction in mass gain after 500 1 h cycles relative to 4140 but an approximate 36% increase in mass gain over H11 after 1000 h. The information shown in FIGS. 7 and 8 was obtained by high temperature automated cyclic oxidation rigs in an atmosphere of air plus 10% water vapor. Seven samples are attached to Pt wire and suspended from alumina rods and then simultaneously lowered into the furnaces and held for 1 h and then removed for 10 minutes, completing 1 cycle, before being reinserted into the furnace for the next cycle Samples are 20 mm long, 10 mm wide, and 1.5 mm thick. Oxidation mass change per unit surface area is recorded by mass balance after every 20 or 50 cycles.

The disclosed alloys include relatively low amounts of strengthening elements such as Mo, W, V and Ti. The alloys can thereby be relatively efficiently and cost effectively manufactured and fabricated into applications such as ICE components. In addition, the relatively lean composition of the alloy enhances thermal conductivity by reducing phonon and electron scattering by non-Fe substitutional atoms.

Figure 11:
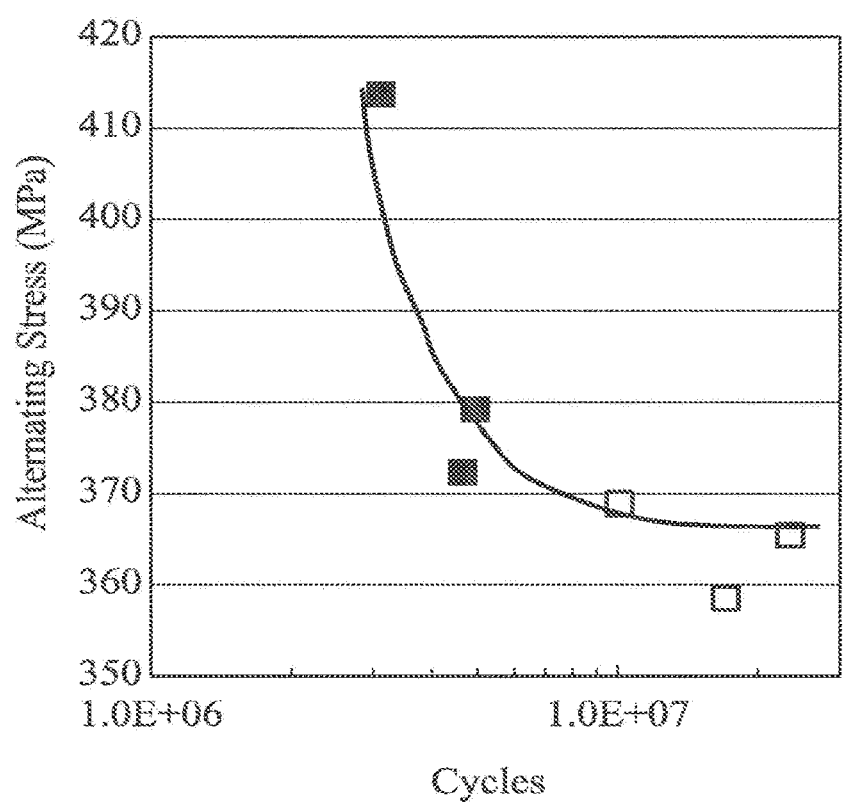
FIG. 11 is a graph of fatigue life vs alternating stress for exemplary alloy 3-5 in accordance with embodiments, obtained by rotating beam fatigue testing (RBF). The filled symbols represent samples that failed during the test while open symbols represent sampled that were removed prior to failure. Prior to RBF testing, alloy 3-5 was austenitized at 1190° C. for 5 minutes, quenched in oil to RT, tempered at 550° C./2 hr, cooled to RT, then tempered again at 650° C./2 hr.

Disclosed alloy 3-5 exhibits a fatigue limit of approximately 365 MPa at 600° C. as measured by rotating beam fatigue (RBF) tests, as shown in FIG. 11. RBF was performed at 10,000 rpm and tests were conducted in accordance with specification ISO 1143(10). The ratio of fatigue limit to UTS for alloy 3-5 is 0.48 at 600° C., which is close to the value of 0.5, which is typical of many steel grades, albeit at lower temperatures. The data suggest that the relatively high elevated temperature UTS values of the disclosed alloys translates to relatively high fatigue limits at 600° C.

Applications

Figure 12:
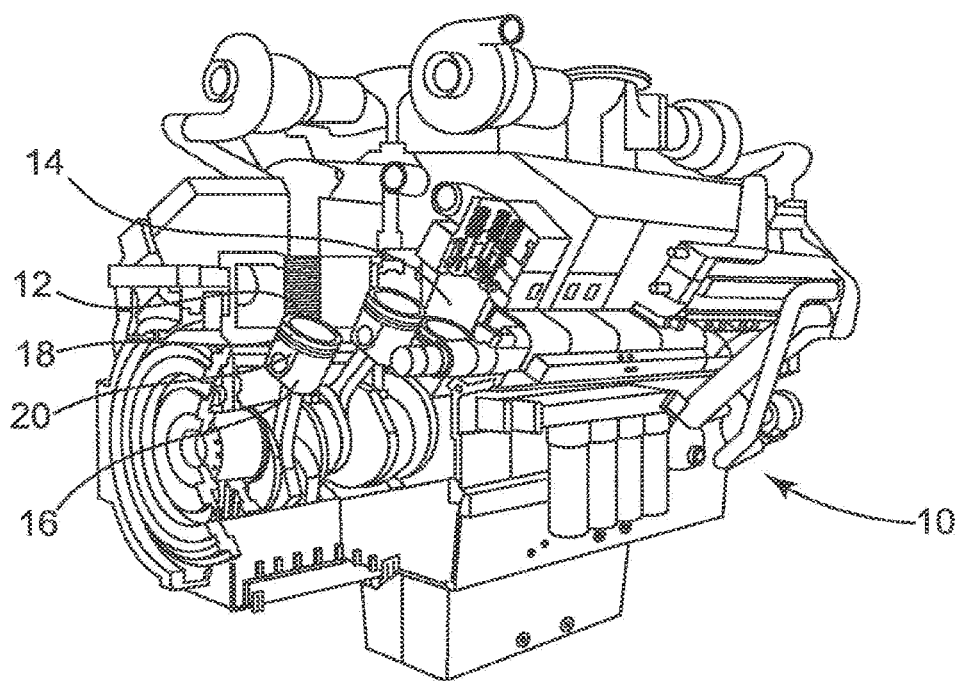
FIG. 12 is a partial sectional view of an internal combustion engine, such as a diesel engine, illustrating components such as pistons fabricated from steel alloys in accordance with embodiments.

FIG. 12 is an illustration of an internal combustion engine 10 including components such as a block 12 including cylinder walls 14, and pistons 16 including crowns 18 (e.g., that are friction welded or otherwise joined to piston bodies) and rings 20, that can be fabricated from the disclosed alloy. Internal combustion engine 10 is shown as an application for purposes of example. The disclosed alloys can be fabricated into other devices or apparatus that may benefit from the desirable properties described herein. For example, the alloy may be fabricated into dies for hot forging. The alloy may also be fabricated into ICE components via additive manufacturing processes.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. A steel alloy, comprising:
   C in an amount of 0.2-0.45 weight %;
   Si in an amount of 0.6-1.1 weight %;
   Mn in an amount of ≤1.1 weight %;
   Cr in an amount of 2.5-4 weight %;
   one or both of Mo or W, a combined amount of the Mo or W≤0.9 weight %;

Ti in an amount of 0.035-0.14 weight %;
V in an amount of 0.18-1.1 weight %;
S in an amount of 0.0-0.05 weight %; and
the balance being Fe and usual impurities;
wherein the alloy is at least one of (1) austenitized at a temperature greater than or equal to 1140° C. followed by cooling at a rate sufficient to cause austenite to transform to martensite, or (2) simultaneously austenitized and forged at a temperature greater than or equal to 1140° C. followed by cooling at a rate sufficient to cause austenite to transform to martensite; and
wherein the alloy has both of (1) thermal conductivity greater than or equal to 28 W/m-K at 400° C. in an as-tempered condition, and (2) ultimate tensile strength greater than or equal to 500 MPa at 600° C. in the as-tempered condition plus aging 500 hours at 600° C.

2. The steel alloy of claim 1, wherein a ratio of Ti:C is between 0.1 and 0.7.

3. The steel alloy of claim 2, where a sum of weight % of Mo, W, and V is between 0.9 and 1.35.

4. The steel alloy of claim 1, where a sum of weight % of Mo, W, and V is between 0.9 and 1.35.

5. The steel alloy consisting essentially of the composition of claim 1.

6. An internal combustion engine component comprising the steel alloy of claim 1.

7. A piston or piston crown including a steel alloy comprising:
C in an amount of 0.2-0.45 weight %,
Si in an amount of 0.6-1.1 weight %;
Mn in an amount of ≤1.1 weight %;
Cr in an amount of 2.5-4.0 weight %;
one or both of Mo or W, a combined amount of the Mo or W≤0.9 weight %;
Ti in an amount of 0.035-0.14 weight %;
V in an amount of 0.18-1.1 weight %;
S in an amount of 0.0-0.05 weight %; and
the balance being Fe and, usual impurities; and
wherein the steel alloy is incorporated into the piston or piston crown;
wherein the alloy is at least one of (1) austenitized at a temperature greater than or equal to 1140° C. followed by cooling at a rate sufficient to cause austenite to transform to martensite, or (2) simultaneously austenitized and forged at a temperature greater than or equal to 1140° C. followed by cooling at a rate sufficient to cause austenite to transform to martensite; and
wherein the alloy has both of (1) thermal conductivity greater than or equal to 28 W/m-K at 400° C. in an as-tempered condition, and (2) ultimate tensile strength greater than or equal to 500 MPa at 600° C. in the as-tempered condition plus aging 500 hours at 600° C.

8. The piston or piston crown of claim 7, wherein a ratio of Ti:C of the steel alloy is between 0.1 and 0.7.

9. The piston or piston crown of claim 8, wherein a sum of weight % of Mo, W, and V of the steel alloy is between 0.9 and 1.35.

10. The piston or piston crown of claim 7, wherein a sum of weight % of Mo, W, and V is between 0.9 and 1.35.

11. The piston or piston crown of claim 7, wherein the steel alloy consists essentially of the composition of claim 7.

12. The piston or piston crown of claim 7, wherein the steel alloy comprises Ni in an amount ≤0.8 weight %.

13. A steel alloy, comprising:
C in an amount of 0.2-0.35 weight %;
Si in an amount of 0.8-1.1 weight %;
Mn in an amount of ≤0.55 weight %;
Cr in an amount of 2.5-3.5 weight %;
Mo in an amount of 0.2-0.7 weight %;
Ti in an amount of 0.035-0.14 weight %;
V in an amount of 0.18-0.55 weight %;
S in an amount of 0.0-0.045 weight %; and
the balance being Fe and usual impurities;
wherein the alloy is at least one of (1) austenitized at a temperature greater than or equal to 1140° C. followed by cooling at a rate sufficient to cause austenite to transform to martensite, or (2) simultaneously austenitized and forged at a temperature greater than or equal to 1140° C. followed by cooling at a rate sufficient to cause austenite to transform to martensite; and
wherein the alloy has both of (1) thermal conductivity greater than or equal to 28 W/m-K at 400° C. in an as-tempered condition, and (2) ultimate tensile strength greater than or equal to 500 MPa at 600° C. in the as-tempered condition plus aging 500 hours at 600° C.

14. An internal combustion engine component comprising the steel alloy of claim 13.

15. An internal combustion engine component consisting essentially of the composition of claim 13.

16. A piston or piston crown comprising the steel alloy of claim 13.

17. The piston or piston crown of claim 16, wherein the steel alloy comprises Ni in an amount ≤0.8 weight %.

18. A piston or piston crown consisting essentially of the composition of claim 13.

19. The piston or piston crown of claim 16, wherein the steel alloy comprises W in an amount such that (Mo+W) is 0.2-0.7 weight %.

20. The steel alloy consisting essentially of the composition of claim 13.

21. A piston or piston crown including a steel alloy comprising:
C in an amount of 0.2-0.35 weight %;
Si in an amount of 0.8-2.0 weight %;
Mn in an amount of ≤0.55 weight %;
Cr in an amount of 2.5-3.5 weight %;
Mo in an amount of 0.2-0.7 weight %;
Ti in an amount of 0.035-0.14 weight %;
V in an amount of 0.18-0.55 weight %;
S in an amount of 0.0-0.045 weight %; and
the balance being Fe and usual impurities;
wherein the alloy is at least one of (1) austenitized at a temperature greater than or equal to 1140° C. followed by cooling at a rate sufficient to cause austenite to transform to martensite, or (2) simultaneously austenitized and forged at a temperature greater than or equal to 1140° C. followed by cooling at a rate sufficient to cause austenite to transform to martensite; and
wherein the alloy has both of (1) thermal conductivity greater than or equal to 28 W/m-K at 400° C. in an as-tempered condition, and (2) ultimate tensile strength greater than or equal to 500 MPa at 600° C. in the as-tempered condition plus aging 500 hours at 600° C.

22. A piston or piston crown including a steel alloy consisting substantially of the composition:
C in an amount of 0.2-0.35 weight %;
Si in an amount of 0.8-2.0 weight %;
Mn in an amount of ≤0.55 weight %;
Cr in an amount of 2.5-3.5 weight %;
(Mo+W) in an amount of 0.2-0.7 weight %;
Ti in an amount of 0.035-0.14 weight %;
V in an amount of 0.18-0.55 weight %;

Ni in an amount ≤0.8 weight %;
S in an amount of 0.0-0.045 weight %; and
the balance being Fe and usual impurities;
wherein the alloy is at least one of (1) austenitized at a temperature greater than or equal to 1140° C. followed by cooling at a rate sufficient to cause austenite to transform to martensite, or (2) simultaneously austenitized and forged at a temperature greater than or equal to 1140° C. followed by cooling at a rate sufficient to cause austenite to transform to martensite; and
wherein the alloy has both of (1) thermal conductivity greater than or equal to 28 W/m-K at 400° C. in an as-tempered condition, and (2) ultimate tensile strength greater than or equal to 500 MPa at 600° C. in the as-tempered condition plus aging 500 hours at 600° C.

* * * * *